US011493092B2

(12) United States Patent
Saito et al.

(10) Patent No.: US 11,493,092 B2
(45) Date of Patent: Nov. 8, 2022

(54) SPEED-REDUCING OR -INCREASING APPARATUS

(71) Applicant: THK CO., LTD., Tokyo (JP)

(72) Inventors: Hideo Saito, Tokyo (JP); Yuichi Mizutani, Tokyo (JP); Kotaro Kushida, Tokyo (JP)

(73) Assignee: THK CO., LTD., Tokyo (JP)

( * ) Notice: Subject to any disclaimer, the term of this patent is extended or adjusted under 35 U.S.C. 154(b) by 364 days.

(21) Appl. No.: 16/635,971

(22) PCT Filed: Jul. 17, 2018

(86) PCT No.: PCT/JP2018/026653
§ 371 (c)(1),
(2) Date: Jan. 31, 2020

(87) PCT Pub. No.: WO2019/026596
PCT Pub. Date: Feb. 7, 2019

(65) Prior Publication Data
US 2021/0140489 A1 May 13, 2021

(30) Foreign Application Priority Data
Aug. 2, 2017 (JP) .............................. JP2017-149606
Apr. 18, 2018 (JP) .............................. JP2018-079781

(51) Int. Cl.
F16D 3/22 (2006.01)
F16D 3/2245 (2011.01)
(Continued)

(52) U.S. Cl.
CPC ........... *F16D 3/2245* (2013.01); *F16H 1/321* (2013.01); *F16H 57/0025* (2013.01);
(Continued)

(58) Field of Classification Search
CPC ............. F16D 3/2245; F16D 2001/103; F16D 2003/22303; F16D 2003/22309;
(Continued)

(56) References Cited

U.S. PATENT DOCUMENTS 1,748,907 A * 2/1930 Vallance ................. F16H 23/04
475/163
2,618,942 A * 11/1952 Dodge .................... F16D 3/223
464/146

(Continued)

FOREIGN PATENT DOCUMENTS

CH 480560 A 10/1969
CN 1910380 A 2/2007
(Continued)

OTHER PUBLICATIONS

Universal Joint and Driveshaft Design Manual, AE-7, Society of Automotive Engineers, Inc., Warendale PA, Section 3.2.1, pp. 99-101, TJ1079.S62. (Year: 1979).*

(Continued)

*Primary Examiner* — Greg Binda
(74) *Attorney, Agent, or Firm* — Nixon & Vanderhye

(57) ABSTRACT

A speed-reducing or -increasing apparatus, with first and second crown gears facing one another, with a cam unit that causes the first crown gear to incline with respect to the second crown gear so that the first crown gear meshes with the second crown gear, that causes the first crown gear to precess in such a manner as to move the meshing position, and couples to an input or output shaft. A rolling element is between the cam unit and the first crown gear, and the cam unit includes a first member that couples to the input or output shaft and a second member made of steel and including a rolling element rolling portion where the rolling element rolls, the second member configured to be incapable of rotating relatively to the first member, and at least part of (Continued)

the first member having a lower specific gravity than the second member.

10 Claims, 16 Drawing Sheets

(51) Int. Cl.
*F16H 57/00* (2012.01)
*F16H 1/32* (2006.01)
*F16D 1/10* (2006.01)
*F16D 3/223* (2011.01)
*F16H 55/17* (2006.01)

(52) U.S. Cl.
CPC ............... *F16D 2001/103* (2013.01); *F16D 2003/22303* (2013.01); *F16D 2003/22309* (2013.01); *F16D 2300/10* (2013.01); *F16D 2300/12* (2013.01); *F16H 2055/173* (2013.01)

(58) Field of Classification Search
CPC .. F16D 2300/10; F16D 2300/12; F16H 1/321; F16H 57/0025; F16H 2055/173
USPC .................................. 475/164; 464/143, 146
See application file for complete search history.

(56) References Cited

U.S. PATENT DOCUMENTS

| | | | |
|---|---|---|---|
| 3,557,572 A | | 1/1971 | Aucktor et al. |
| 3,595,103 A | * | 7/1971 | Wildhaber ............... F16H 1/321 475/164 |
| 4,549,873 A | * | 10/1985 | Krude ..................... F16D 3/221 |
| 7,632,190 B2 | | 12/2009 | Nakao et al. |
| 2007/0161428 A1 | | 7/2007 | Nakao et al. |
| 2018/0045280 A1 | | 2/2018 | Saito et al. |

FOREIGN PATENT DOCUMENTS

| | | |
|---|---|---|
| CN | 101493119 A | 7/2009 |
| CN | 101493120 A | 7/2009 |
| CN | 201434023 Y | 3/2010 |
| CN | 101949418 A | 1/2011 |
| CN | 107250607 A | 10/2017 |
| DE | 1251595 B | 10/1967 |
| DE | 112016000998 T5 | 11/2017 |
| EP | 1707835 A1 | 10/2006 |
| EP | 2228557 A1 | 9/2010 |
| EP | 2233764 A2 | 9/2010 |
| FR | 1598079 A | 6/1970 |
| GB | 1150778 A | 4/1969 |
| GB | 1261899 A | 1/1972 |
| JP | S48-19803 B1 | 6/1973 |
| JP | S48-38653 B1 | 11/1973 |
| JP | S54-1853 B1 | 1/1979 |
| JP | 2009-174639 A | 8/2009 |
| JP | 2009-191911 A | 8/2009 |
| TW | 200526883 A | 8/2005 |
| TW | 201641839 A | 12/2016 |
| WO | 2005/068863 A1 | 7/2005 |
| WO | 2016-140234 A1 | 9/2016 |

OTHER PUBLICATIONS

International Search Report, dated Oct. 23, 2018, from corresponding PCT application No. PCT/JP2018/026653.
Office Action issued in Chinese Patent Application No. 201880050519.7 dated Aug. 18, 2021.

* cited by examiner

SPEED-REDUCING OR -INCREASING APPARATUS

TECHNICAL FIELD

The present invention relates to a spline structure that is, for example, integrated into a precession speed-reducing or -increasing apparatus, or used as a constant velocity joint.

BACKGROUND ART

A precession speed-reducing apparatus includes a first crown gear, a second crown gear, a cam unit, and a spline structure (refer to Patent Literature 1). The first and second crown gears face each other, and are different in the number of teeth. The cam unit causes the first crown gear to incline with respect to the second crown gear in such a manner that the first crown gear meshes with the second crown gear, and causes the first crown gear to precess in such a manner as to move the meshing position. When the first crown gear precesses, the second crown gear reduces the speed and rotates by the difference in the number of teeth.

CITATION LIST

Patent Literature

Patent Literature 1: WO 2016/140234 A

SUMMARY OF INVENTION

Technical Problem

In the known precession speed-reducing apparatus, a rolling element is disposed between the cam unit and the first crown gear in such a manner that the first crown gear precesses smoothly. A rolling element rolling portion where the rolling element rolls is formed on the cam unit. Therefore, the cam unit is made of steel to increase durability. However, the cam unit rotates at high speed together with an input shaft. There is a problem that if the cam unit is made of steel, especially when the diameter of the cam unit is large, the inertia of the cam unit is increased, and controllability is reduced.

Hence, an object of the present invention is an object of providing a precession speed-reducing or -increasing apparatus that can reduce the inertia of a cam unit.

In order to solve the above problem, one aspect of the present invention is a speed-reducing or -increasing apparatus that includes a first crown gear, a second crown gear facing the first crown gear, and a cam unit configured to cause the first crown gear to incline with respect to the second crown gear in such a manner that the first crown gear meshes with the second crown gear, to cause the first crown gear to precess in such a manner as to move the meshing position, and to be coupled to an input or output shaft. Further, this apparatus according to the present invention includes a rolling element between the cam unit and the first crown gear, and the cam unit includes each of a first member configured to be coupled to the input or output shaft and a second member made of steel including a rolling element rolling portion where the rolling element rolls, where the second member is configured to be incapable of rotating relatively to the first member, and at least part of the first member has a lower specific gravity than the second member.

According to the aspect of the present invention, at least the part of the first member of the cam unit has a lower specific gravity than the second member. Accordingly, the inertia of the cam unit can be reduced. Moreover, the second member of the cam unit having the rolling element rolling portion is made of steel. Accordingly, it is possible to prevent the durability of the cam unit from decreasing.

DESCRIPTION OF EMBODIMENTS

Embodiments where a spline structure of the present invention is implemented are described in detail hereinafter with reference to the accompanying drawings. However, the spline structure of the present invention can be implemented in various modes, and is not limited to the embodiments described in the description. The embodiments are provided with the intention of enabling those skilled in the art to fully understand the scope of the invention by fully disclosing the description.

First Embodiment

Figure 1:
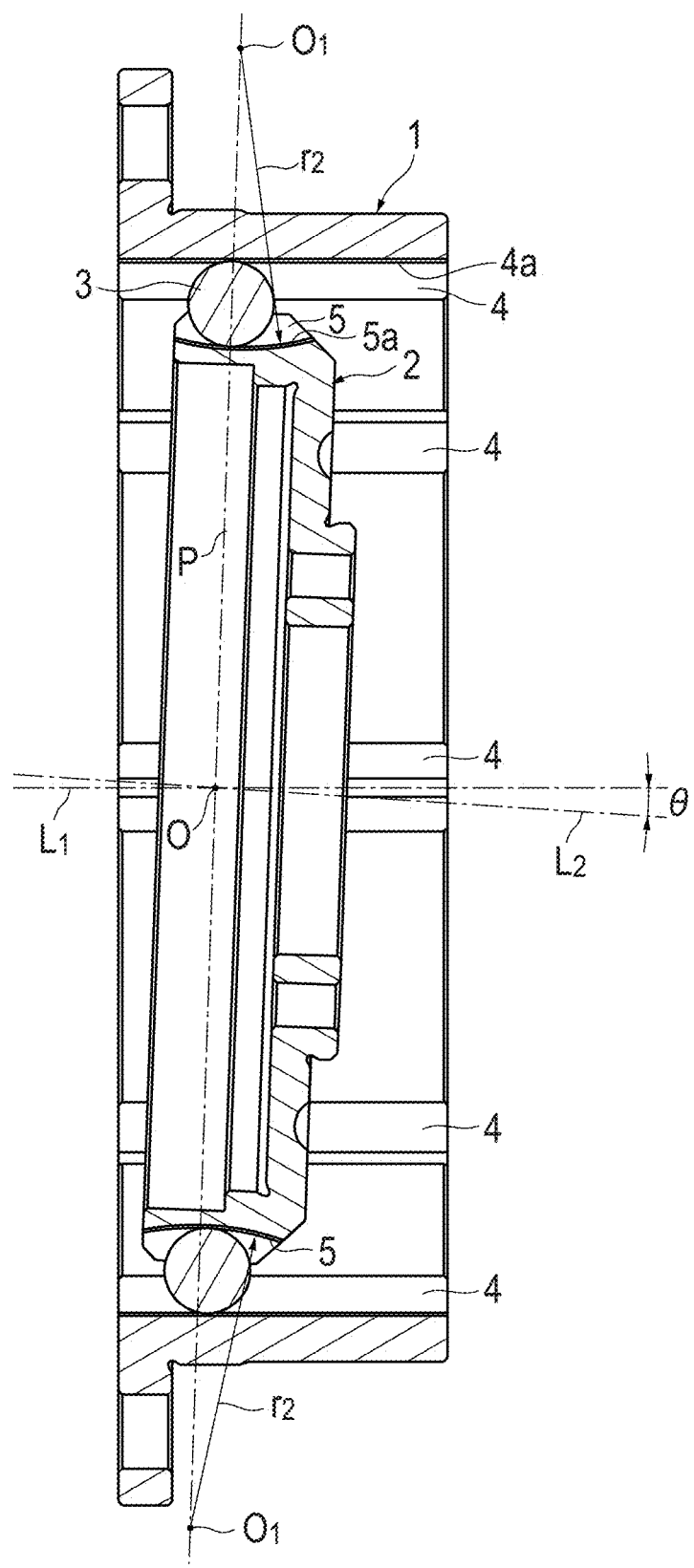
FIG. 1 is a cross-sectional view of a spline structure of a first embodiment of the present invention.

FIG. 1 is a cross-sectional view of a spline structure of a first embodiment of the present invention. The spline structure of the embodiment includes an outer ring 1 as an outer member, an inner ring 2 as an inner member, and balls 3. The inner ring 2 is inclined by precession. FIG. 1 illustrates a state where the inner ring 2 is inclined by an angle θ with respect to the outer ring 1 (in other words, the state where the angle of intersection of an axial line $L_1$ of the outer ring 1 and an axial line $L_2$ of the inner ring 2 is θ). The inclination of the inner ring 2 with respect to the outer ring 1 is relative. Either of the outer ring 1 and the inner ring 2 may incline. The axial line $L_1$ of the outer ring 1 and the axial line $L_2$ of the inner ring 2 intersect at a center O of precession. The spline structure of the embodiment is integrated into a precession speed-reducing apparatus, and is used to permit a first crown gear 11 (refer to FIG. 7) mounted on the inner ring 2 to precess. The precession speed-reducing apparatus is described later.

Figure 2:
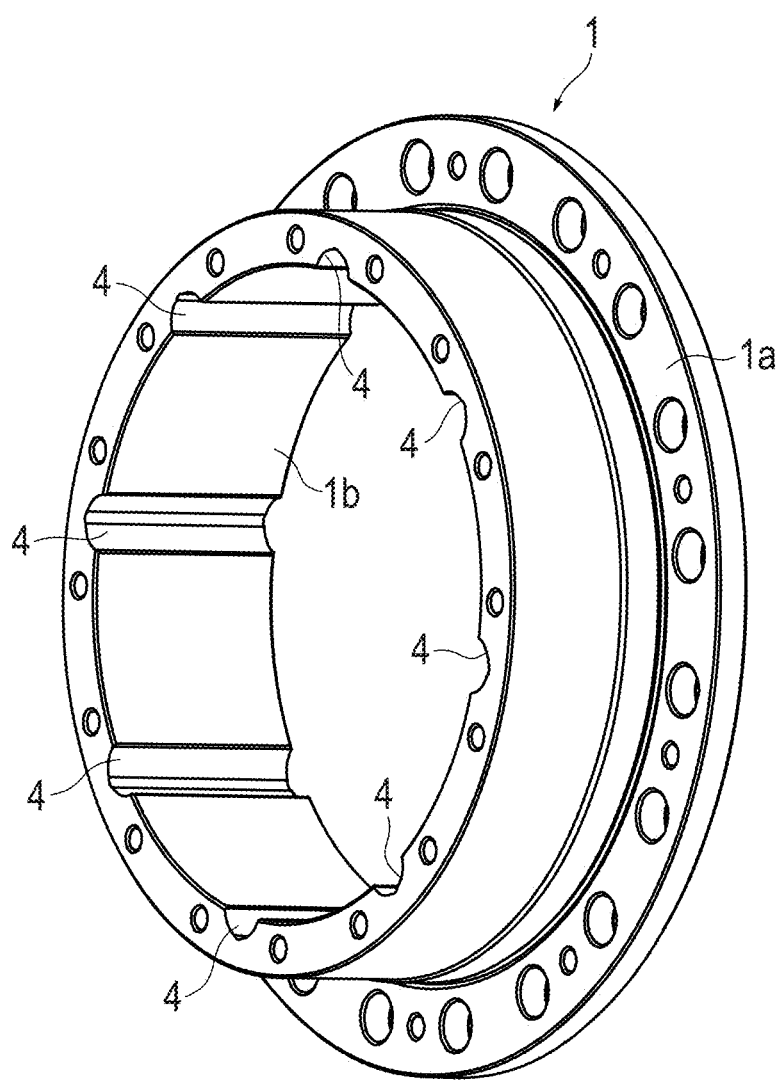
FIG. 2 is a perspective view of an outer ring of the embodiment.

A plurality of, for example, eight, first track grooves 4 is formed along the axial direction at regular intervals in the circumferential direction on an inner surface of the outer ring 1 (refer to FIG. 2). A plurality of, for example, eight, second track grooves 5 each paired with the first track groove 4 are formed along the axial direction at regular intervals in the circumferential direction on an outer surface of the inner ring 2 (refer to FIG. 3). The first track grooves 4 and the second track grooves 5 form eight ball tracks together. One ball 3 is placed on each ball track.

As illustrated in FIG. 2, the outer ring 1 has a substantially cylindrical shape. An end portion of the outer ring 1 in the axial direction is provided with a flange 1a for mounting the outer ring 1 on a counterpart component (a housing of the precession speed-reducing apparatus). An inner surface 1b of the outer ring 1 is a cylindrical surface. The first track grooves 4 are formed on the inner surface 1b.

Figure 4:
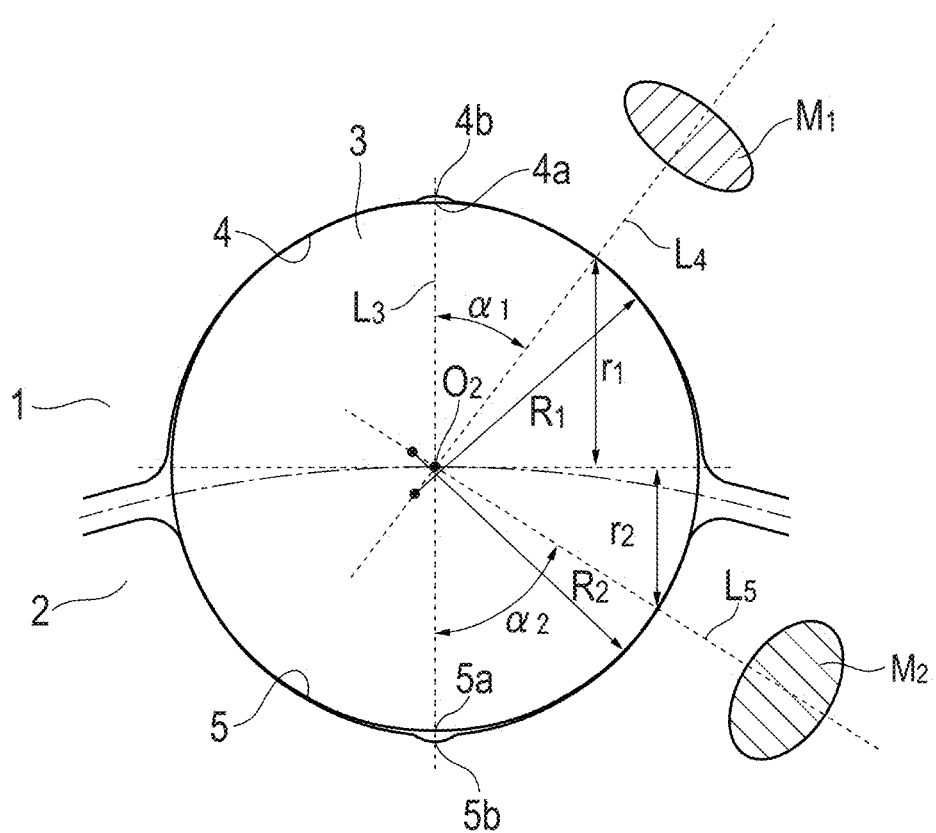
FIG. 4 is a diagram illustrating the angles of contact of the embodiment.

As illustrated in FIG. 4, the first track groove 4 is formed into a Gothic arch groove shape including two arcs $R_1$ in a cross section orthogonal to the axial line $L_1$ of the outer ring 1 (to be precise, a plane orthogonal to the center O of precession in a state where the axial line $L_1$ of the outer ring 1 and the axial line $L_2$ of the inner ring 2 are aligned). The two arcs $R_1$ have a larger radius of curvature than the radius of the ball 3, and intersect near a bottom portion 4a. The ball 3 comes into contact at two points with the first track groove 4 at an angle $\alpha_1$ of contact (reference numerals are assigned to only the right half of the groove 4 in FIG. 4, and the groove 4 is left-right symmetric). $\alpha_1$ is, for example, equal to or greater than 30 degrees and equal to or less than 40 degrees. Here, the angle $\alpha_1$ of contact is an angle formed by a line $L_3$ linking a center $O_2$ of the ball 3 and the bottom portion 4a of the first track groove 4, and a line $L_4$ linking the center $O_2$ of the ball 3 and a point of contact with the first track groove 4 (to be precise, the center of a contact ellipse $M_1$ formed by contact between the ball 3 and the first track groove 4). The ball 3 comes into contact with the second track groove 5 at the angle $\alpha_1$ of contact to form a clearance at an actual bottom portion 4b of the first track groove 4. Considering them, let an outer end of the ball 3 be the bottom portion 4a of the first track groove 4 in the present invention. A distance between the bottom portion 4a of the first track groove 4 and the actual bottom portion 4b of the first track groove 4 is constant across the length direction of the first track groove 4.

As illustrated in FIG. 1, the first track groove 4 extends linearly in the axial direction of the outer ring 1. The first track groove 4 has a constant depth from one end portion to the other end portion of the outer ring 1 in the axial direction. The bottom portion 4a of the first track groove 4 along the length direction has a linear shape and is parallel to the axial line $L_1$ of the outer ring 1. The angle $\alpha_1$ of contact of the first track groove 4 is constant in the length direction of the first track groove 4.

Figure 3:
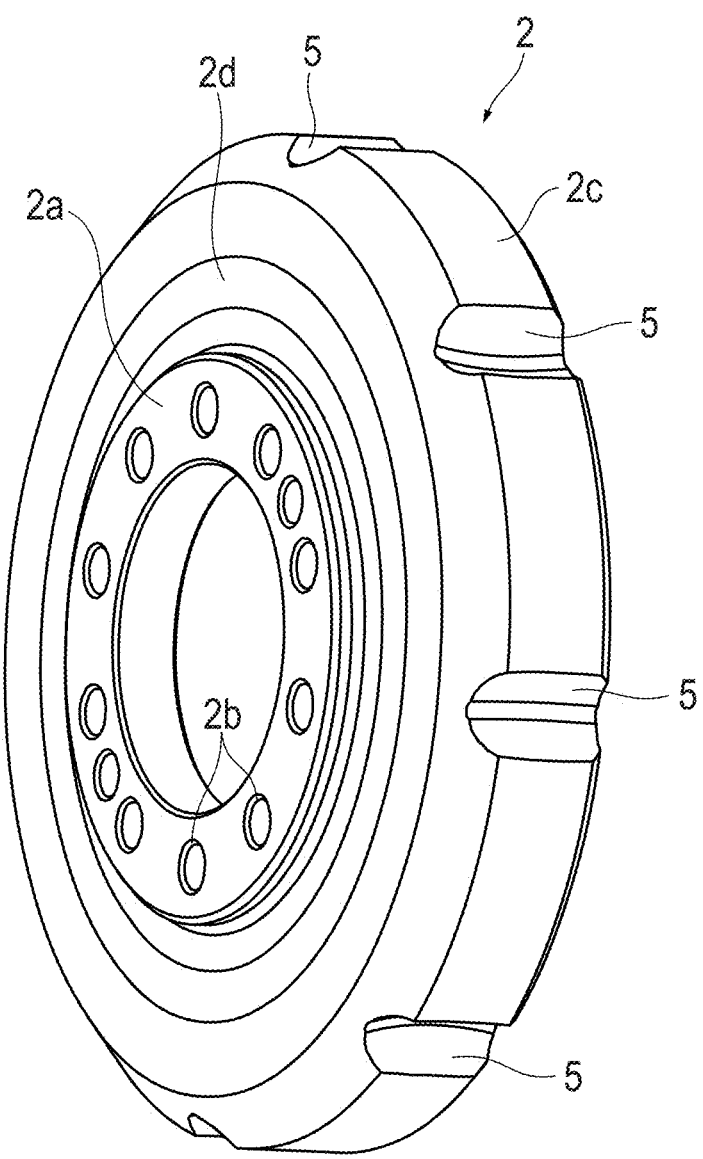
FIG. 3 is a perspective view of an inner ring of the embodiment.

As illustrated in FIG. 3, the inner ring 2 has a substantially bottomed short cylindrical shape. Multiple mounting portions 2b for, for example, screws for mounting the inner ring 2 on a counterpart component are formed in a disc portion 2a of the inner ring 2. An outer surface 2c of the inner ring 2 is a cylindrical surface. The second track grooves 5 are formed on the outer surface 2c.

As illustrated in FIG. 4, the second track groove 5 is formed into a Gothic arch groove shape including two arcs $R_2$ in a cross section orthogonal to the axial line $L_2$ of the inner ring 2 (to be precise, a plane orthogonal to the center O of precession in the state where the axial line $L_1$ of the outer ring 1 and the axial line $L_2$ of the inner ring 2 are aligned). The two arcs $R_2$ have a larger radius of curvature than the radius of the ball 3, and intersect at a bottom portion 5a. The ball 3 comes into contact at two points with the second track groove 5 at an angle $\alpha_2$ of contact. $\alpha_2$ is, for example, equal to or greater than 55 degrees and equal to or less than 65 degrees. Here, the angle $\alpha_2$ of contact is an angle formed by the line $L_3$ linking the center $O_2$ of the ball 3 and the bottom portion 5a of the second track groove 5, and a line $L_5$ linking the center $O_2$ of the ball 3 and a point of contact with the second track groove 5 (to be precise, the center of a contact ellipse $M_2$ formed by contact between the ball 3 and the second track groove 5). The ball 3 comes into contact with the second track groove 5 at the angle $\alpha_2$ of contact to form a clearance at an actual bottom portion 5b of the second track groove 5. Considering them, let an inner end of the ball 3 be the bottom portion 5a of the second track groove 5 in the present invention. A distance between the bottom portion 5a of the second track groove 5 and the actual bottom portion 5b of the second track groove 5 is constant across the length direction of the second track groove 5.

As illustrated in FIG. 1, the bottom portion 5a of the second track groove 5 along the length direction has a concave curve shape and, in the embodiment, has an arc shape. A center (center of curvature) $O_1$ of the bottom portion 5a of the second track groove 5 is located in a plane P that passes the center O of precession and is orthogonal to the axial line $L_2$ of the inner ring 2. The radius of curvature of the second track groove 5 is $r_2$. The angle $\alpha_2$ of contact of the second track groove 5 is constant in the length direction of the second track groove 5. As illustrated in FIG. 1, the bottom portion 5a of the second track groove 5 is formed into a concave arc shape, and the bottom portion 4a of the first track groove 4 has a linear shape; therefore, as illustrated in FIG. 4, the area of the contact ellipse $M_2$ is greater than the area of the contact ellipse $M_1$.

As illustrated in FIG. 1, in terms of the depth, the second track groove 5 is shallow at both end portions of the inner ring 2 in the axial direction, and is deep at the middle portion in the axial direction. In order to place the ball 3 between the first track groove 4 and the second track groove 5, the inner ring 2 is greatly inclined, and then the inclination of the inner ring 2 is returned to its original angle. Consequently, the ball 3 does not drop off.

The ball 3 is made of, for example, steel, and has a spherical shape. One ball 3 is placed between each first track groove 4 and each second track groove 5. With the precession of the inner ring 2, the ball 3 reciprocates in the axial direction between the first track groove 4 and the second track groove 5. At this point in time, the position of the ball 3 is determined by the first track groove 4 and the second track groove 5. Hence, there is no need to provide a cage for retaining the ball 3 between the outer ring 1 and the inner ring 2.

Next, the action of the spline structure of the embodiment is described. When the outer ring 1 is fixed, the inner ring 2 is permitted only precession, and the inner ring 2 does not rotate about the axial line thereof. On the other hand, when the outer ring 1 is rotated, the rotation torque is transmitted to the inner ring 2 via the ball 3, and the outer ring 1 and the inner ring 2 rotate at constant speed. The same applies to when the inner ring 2 is rotated. When the angle θ of intersection of the outer ring 1 and the inner ring 2 changes, the ball 3 rolls between the first track groove 4 and the second track groove 5. Accordingly, the change of the angle θ of intersection is permitted.

Next, effects (1) to (4) of the spline structure of the embodiment are described.

Figure 5:
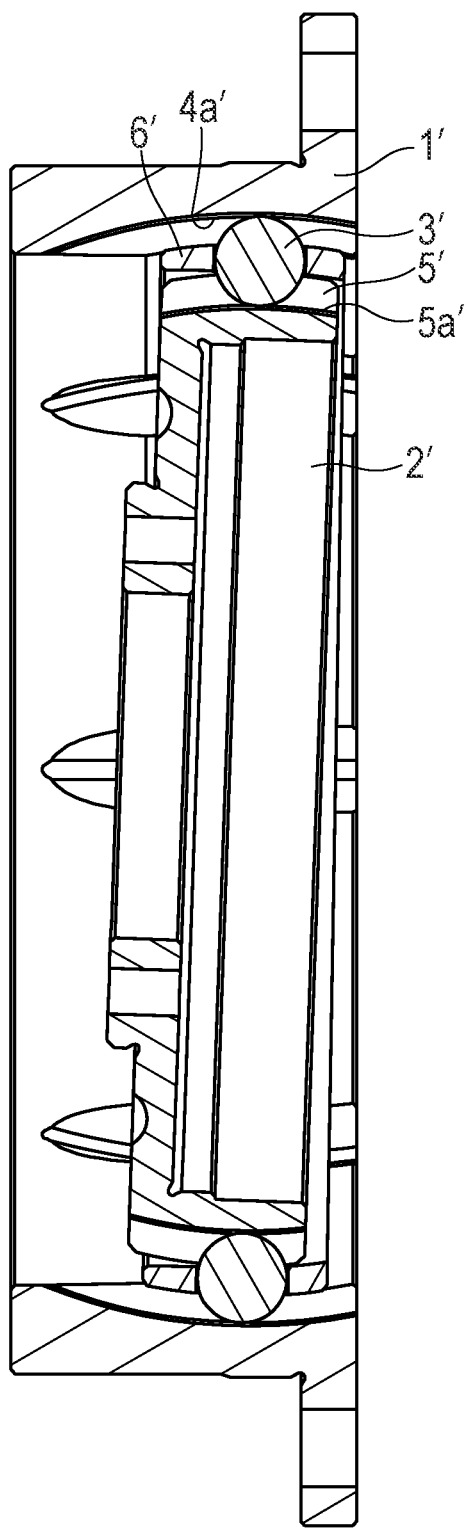
FIG. 5 is a cross-sectional view of a spline structure of a known example.
Figure 6:
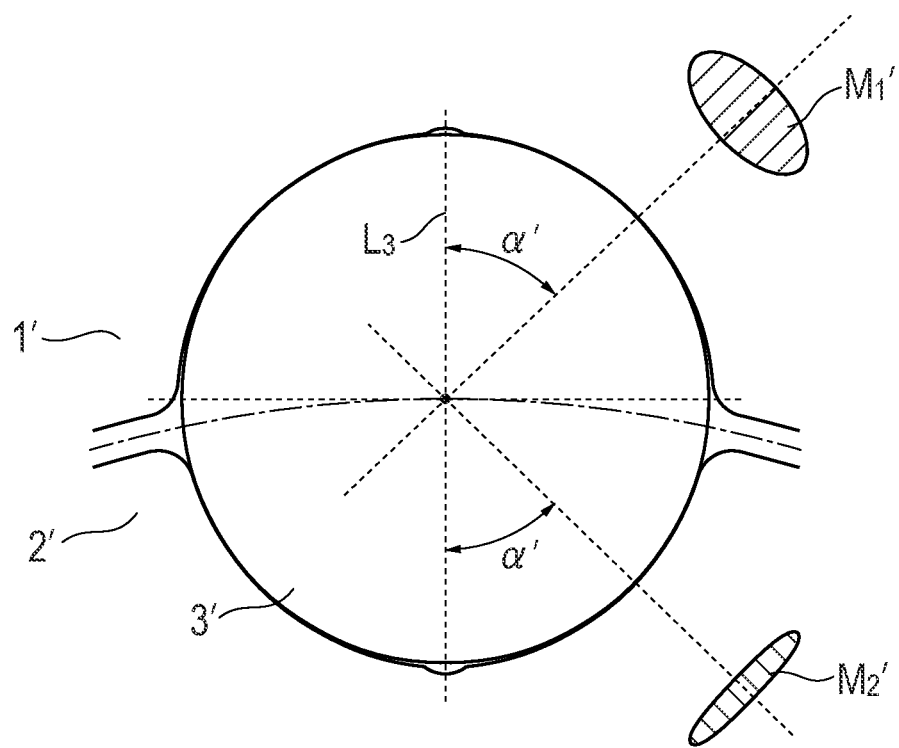
FIG. 6 is a diagram illustrating the angle of contact of the spline structure of the known example.

(1) In the embodiment, the bottom portion Sa of the second track groove 5 of the inner ring 2 along the length direction has a concave arc shape. Hence, the area of the contact ellipse $M_2$ can be increased. In the known example (as illustrated in FIG. 5, a bottom portion Sa' of a second track groove 5' of an inner ring 2' along a length direction thereof has a convex arc shape), the second track groove 5' of a convex arc shape and a ball 3' come into contact with each other; accordingly, as illustrated in FIG. 6, the area of a contact ellipse $M_2'$ of the second track groove 5' and the ball 3' is small, and the bearing stress of when torque is applied results in increasing. Due to the bearing stress, the rated load of the spline structure cannot be increased, and/or a reduction in the size/weight of the spline structure cannot be promoted. According to the spline structure of the embodiment, it is possible to solve such problems, ensure a predetermined rated load of the spline structure, and/or promote a reduction in the size/weight of the spline structure. If the spline structure of the embodiment is used for a joint of a motor vehicle, a reduction in the size/weight of the spline structure leads to an improvement in fuel efficiency of the motor vehicle.

However, in the embodiment, the bottom portion 4a along the first track groove 4 of the outer ring 1 has a linear shape; accordingly, the area of the contact ellipse $M_1$ formed by contact between the first track groove 4 and the ball 3 is reduced as compared to the known example where a bottom portion 4a' has a concave arc shape and the contact ellipse is $M_1'$ (refer to FIGS. 5 and 6). However, the distance between the axial line $L_1$ of the outer ring 1 and the first track groove 4 (that is, the arm length of when torque is applied) is greater than the distance between the axial line $L_2$ of the inner ring 2 and the second track groove 5 (that is, the arm length of when torque is applied). Accordingly, the rated load of the spline structure is mainly determined by the area of the contact ellipse $M_2$ between the second track groove 5 and the ball 3. Hence, a reduction in the area of the contact ellipse $M_1$ hardly influences the rated load.

(2) In the embodiment, the bottom portion 4a along the first track groove 4 has a linear shape. Hence, the center O of precession of the inner ring 2 can move in the axial direction of the outer ring 1. If the spline structure is used for a precession speed-reducing apparatus, the spline structure accommodates a gear mesh error. Accordingly, the tolerance of a component of the precession speed-reducing apparatus can be relaxed, and productivity is increased. On the other hand, if the spline structure is used for a joint, the alignment of the center of the joint becomes possible, and the spline structure can also be used for a sliding joint. Moreover, the bottom portion 4a along the first track groove 4 has a linear shape. Accordingly, the first track groove 4 can be processed with, for example, a broaching machine. The processing of the first track groove 4 is easy.

(3) In the embodiment, the position of the ball 3 is determined by the first track groove 4 and the second track groove 5, and a cage for retaining the ball 3 is not required between the outer ring 1 and the inner ring 2. The spline structure of the known example requires a cage 6' (refer to FIG. 5) for determining the position of the ball 3'. In the known example, the ball 3' is excessively restrained not only between a first track groove 4' and the second track groove 5' but also by the cage 6'. Accordingly, the ball 3' hits the cage 6' strongly, and efficiency is lost. According to the embodiment, the cage 6' is not provided; therefore, efficiency can be increased. Moreover, in the embodiment, the cage 6' is not provided; therefore, assembly can be facilitated.

(4) In the embodiment, the angle $\alpha_2$ of contact of the second track groove 5 is greater than the angle $\alpha_1$ of contact of the first track groove 4. Although the details are described later, according to the embodiment, the travel distance of the ball 3 along the arc-shaped second track groove 5 can approach the travel distance of the ball 3 along the linear first track groove 4, and the slip of the ball 3 can be reduced. Moreover, as described above, the arm length of the second track groove 5 is less than the arm length of the first track groove 4, and a greater force acts on the second track groove 5 than on the first track groove 4. According to the embodiment, the angle $\alpha_2$ of contact of the second track groove 5 is greater than the angle $\alpha_1$ of the first track groove 4; accordingly, an angle of contact suitable to receive torque can be obtained.

Precession Speed-Reducing Apparatus of First Embodiment

Figure 7:
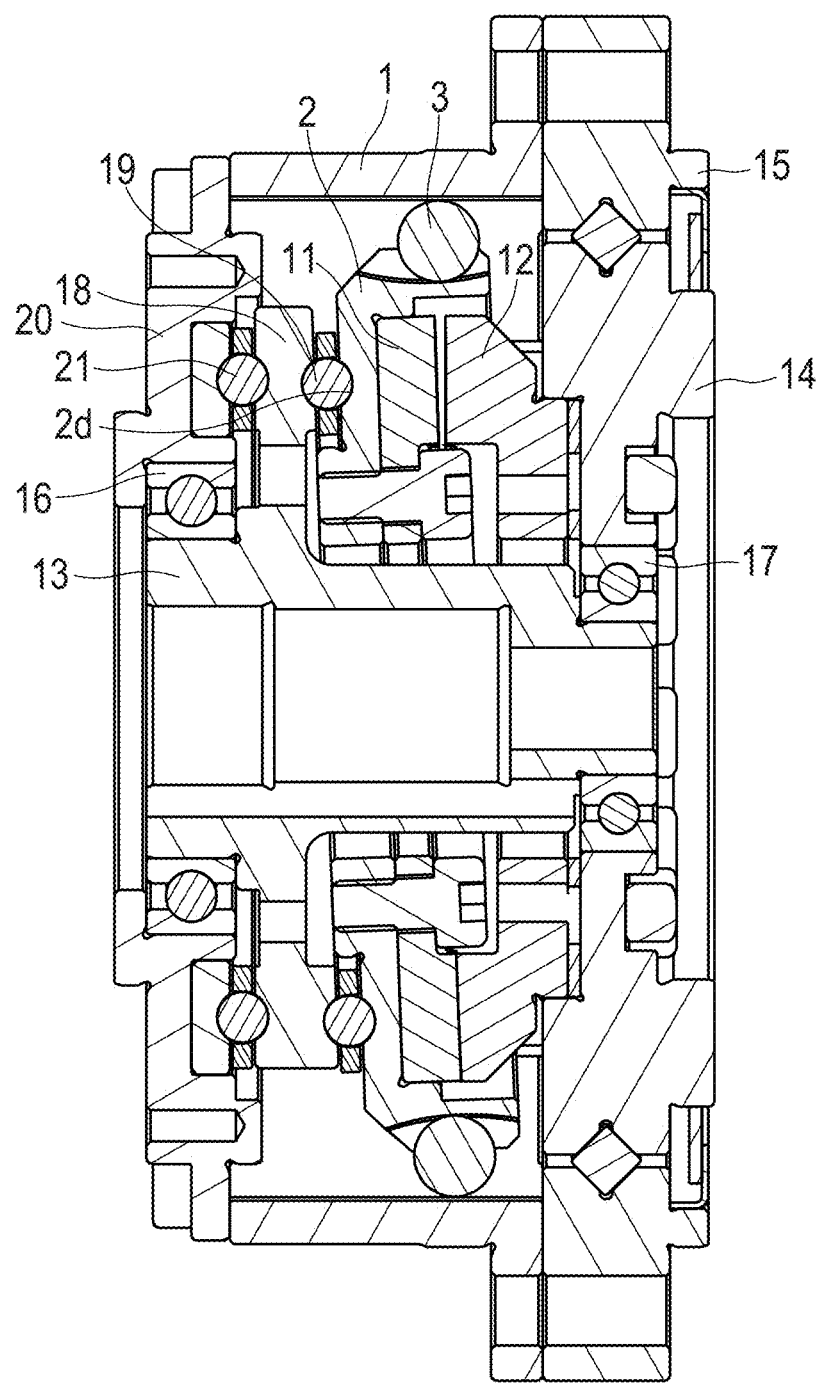
FIG. 7 is a cross-sectional view of a precession speed-reducing apparatus of the first embodiment of the present invention.

FIG. 7 illustrates a cross-sectional view of a precession speed-reducing apparatus 9 of the first embodiment of the present invention where the spline structure of the first embodiment is integrated. The reference numeral 1 denotes an outer ring, the reference numeral 2 denotes an inner ring, the reference numeral 3 denotes a ball, a reference numeral 13 denotes an input unit, and a reference numeral 14 denotes an output unit.

The outer ring 1 configures a housing of the precession speed-reducing apparatus 9. The first crown gear 11 is fixed to the inner ring 2. The first crown gear 11 is supported by the outer ring 1 in such a manner as to be capable of precessing. The first crown gear 11 faces a second crown gear 12. A plurality of teeth is radially formed on an opposed surface of the first crown gear 11 and an opposed surface of the second crown gear 12. The first crown gear 11 is different in the number of teeth from the second crown gear 12.

The second crown gear 12 is fixed to the output unit 14. The output unit 14 is rotatably supported by an outer ring 15 of a cross roller bearing. The outer ring 15 of the cross roller bearing is fixed to the outer ring 1 of the spline structure of the first embodiment.

The input unit 13 is rotatably supported by bearings 16 and 17. An input shaft of, for example, a motor is coupled to the input unit 13 via a key in such a manner as to be incapable of rotating. An inclined cam 18 is fixed to the input unit 13. The inclined cam 18 causes the first crown gear 11 to incline with respect to the second crown gear 12 and causes the first crown gear 11 to mesh with the second crown gear 12. Multiple balls 19 are disposed between the inclined cam 18 and the first crown gear 11 in such a manner as to be capable of rolling motion. A raceway 2d (refer also to FIG. 3) where the balls 19 roll is formed on the inner ring 2. Multiple balls 29 are also disposed between the inclined cam 18 and a lid member 20 to be fixed to the outer ring 1 in such a manner as to be capable of rolling motion.

When the input unit 13 is rotated by, for example, the unillustrated motor, the inclined cam 18 causes the first crown gear 11 to precess while moving the position meshing with the second crown gear 12. The spline structure permits the first crown gear 11 only precession. The rotation of the first crown gear 11 about the axial line is restricted. The precession of the first crown gear 11 causes the second crown gear 12 to rotate with respect to the first crown gear 11 by the difference in the number of teeth. The output unit 14 fixed to the second crown gear 12 then rotates.

Assuming that the output unit 14 is set on the input side, and the input unit 13 is set on the output side, use as a speed-increasing apparatus is possible.

Joint where Spline Structure of First Embodiment is Integrated

Figure 8:
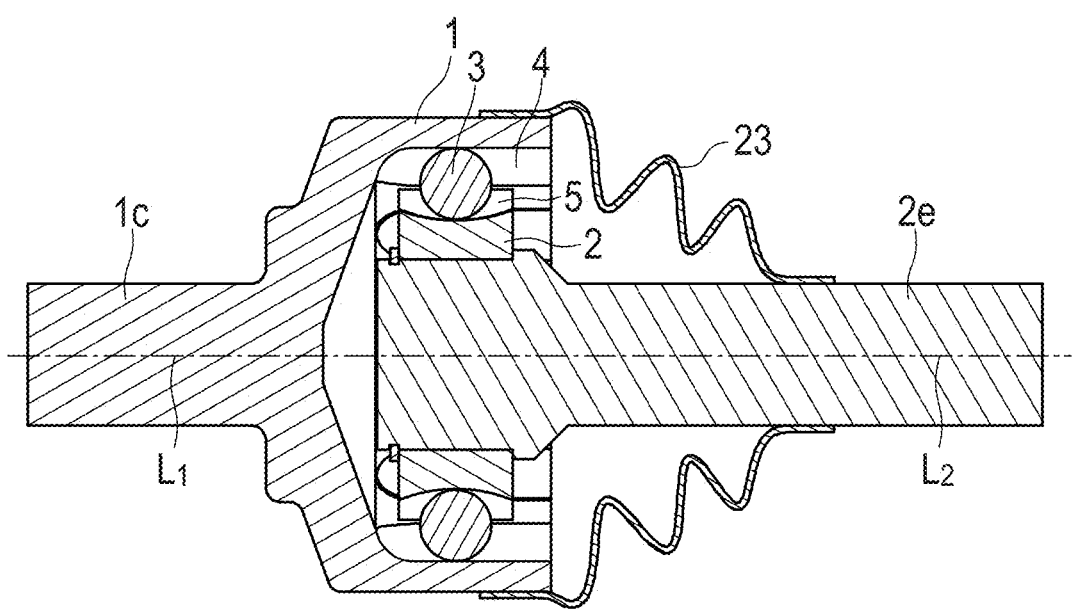
FIG. 8 is a cross-sectional view of a joint of the embodiment (the angle of intersection is 0°).
Figure 9:
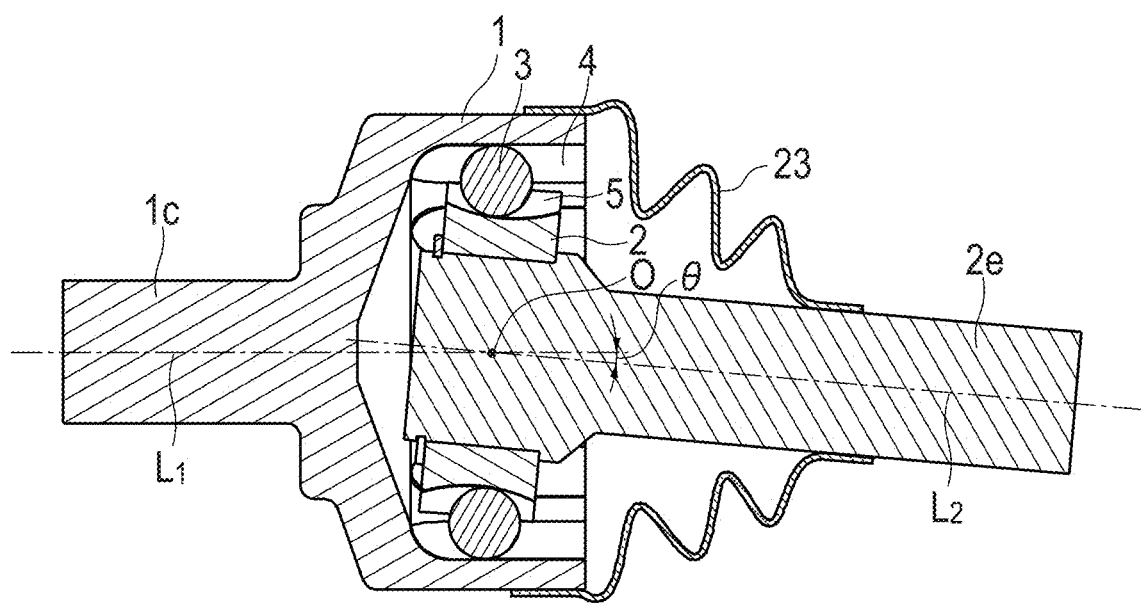
FIG. 9 is a cross-sectional view of the joint of the embodiment (the angle of intersection is θ).

FIGS. 8 and 9 illustrate cross-sectional views of a joint that uses the spline structure of the first embodiment. The joint includes the outer ring 1 as the outer member, the inner ring 2 as the inner member, the balls 3, and a boot 23. FIG. 8 illustrates a state where the axial line $L_1$ of the outer ring 1 and the axial line $L_2$ of the inner ring 2 are aligned. FIG. 9 illustrates a state where the axial line $L_1$ of the outer ring 1 and the axial line $L_2$ of the inner ring 2 intersect at the angle θ of intersection.

The outer ring 1 is formed into a bottomed cylindrical shape. A shaft 1c is formed integrally with the outer ring 1. The plurality of first track grooves 4 is formed along the axial direction at regular intervals in the circumferential direction on a cylindrical inside diameter surface of the outer ring 1. The shape of the first track groove 4 is the same as the one illustrated in FIG. 1. Accordingly, the same reference numeral is assigned and a description thereof is omitted.

The inner ring 2 is formed into a cylindrical shape. A shaft 2e is coupled to the inner ring 2 via serrations. The plurality of second track grooves 5 is formed along the axial direction at regular intervals in the circumferential direction on a cylindrical outside diameter surface of the inner ring 2. The shape of the second track groove 5 is the same as the one illustrated in FIG. 1. Accordingly, the same reference numeral is assigned and a description thereof is omitted. The first track groove 4 and the second track groove 5 face each other. The ball 3 is disposed between them.

When one of the outer ring 1 and the inner ring 2 is rotated, the rotation torque is transmitted to the other of the outer ring 1 and the inner ring 2 via the ball 3. The outer ring 1 and the inner ring 2 rotate at constant speed. When the angle θ of intersection of the outer ring 1 and the inner ring 2 changes, the ball 3 rolls between the first track groove 4 and the second track groove 5, and the change of the angle θ of intersection is permitted.

Spline Structure of Second Embodiment

Figure 10:
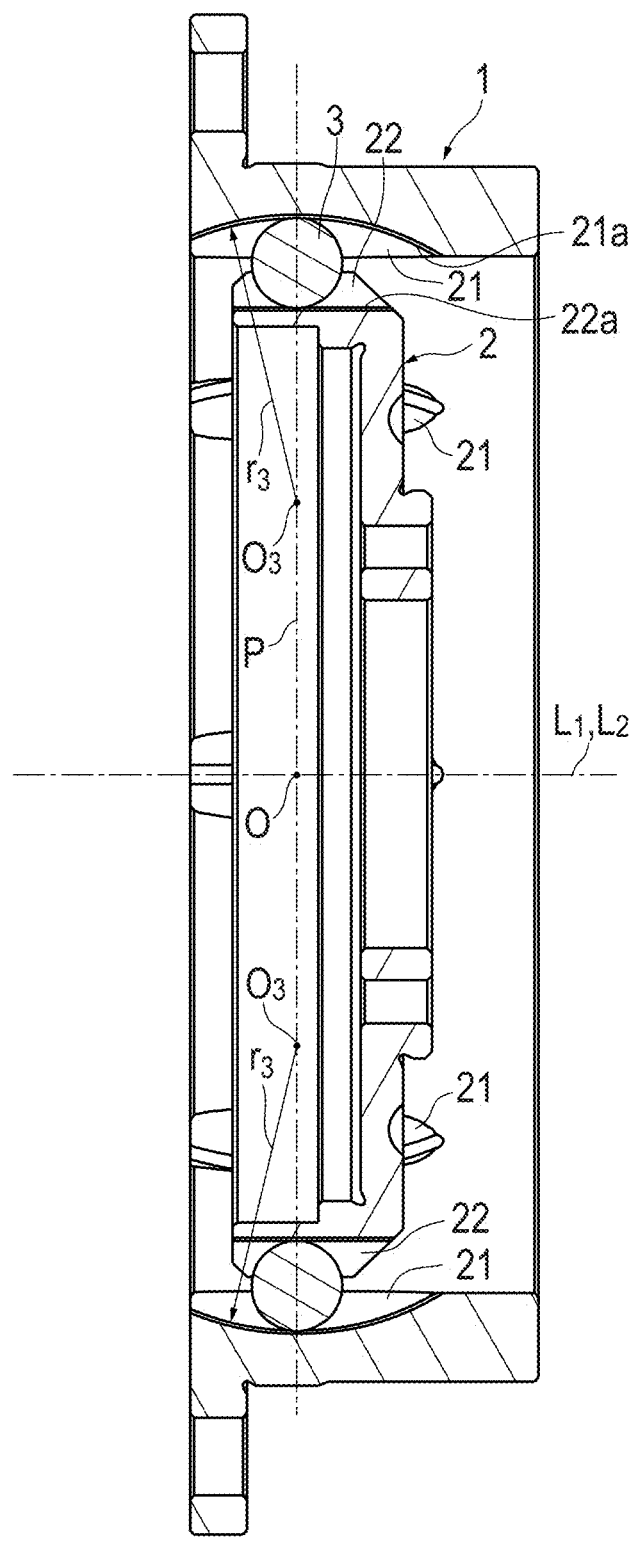
FIG. 10 is a cross-sectional view of a spline structure of a second embodiment of the present invention.

FIG. 10 illustrates a second embodiment where the spline structure of the present invention is implemented. The second embodiment is obtained by changing the shapes of the first track groove 4 and the second track groove 5 of the first embodiment. The same reference numerals are assigned to configurations similar to those of the first embodiment, and detailed descriptions thereof are omitted.

As illustrated in FIG. 10, a bottom portion 21a of a first track groove 21 of the outer ring 1 along a length direction thereof has a concave curve shape and, in the embodiment, has an arc shape. A center (center of curvature) $O_3$ of the bottom portion 21a of the first track groove 21 is located in a plane P that passes the center O of precession and is orthogonal to the axial line of the outer ring 1. The radius of curvature of the first track groove 21 is $r_3$.

A second track groove 22 of the inner ring 2 extends linearly in the axial direction of the inner ring 2. The second track groove 22 has a constant depth from one end portion to the other end portion in the axial direction of the inner ring 2. A bottom portion 22a along a length direction of the second track groove 22 has a linear shape and is parallel to the axial line $L_2$ of the inner ring 2.

One ball 3 is placed between each first track groove 21 and each second track groove 22. With the precession of the inner ring 2, the ball 3 reciprocates in the axial direction between the first track groove 21 and the second track groove 22. The position of the ball 3 is determined by the first track groove 21 and the second track groove 22. A cage for retaining the ball 3 is not provided between the outer ring 1 and the inner ring 2.

According to the second embodiment, effects similar to the effects (1) to (3) of the first embodiment are exerted.

Spline Structure of Third Embodiment

Figure 11:
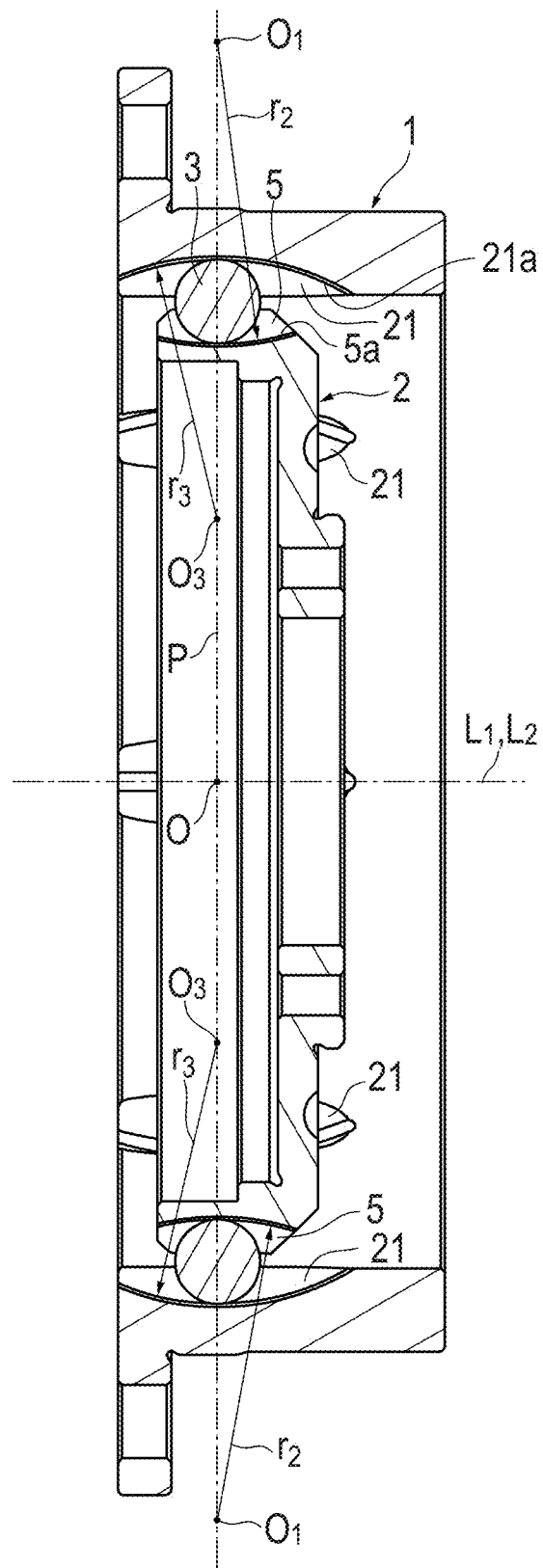
FIG. 11 is a cross-sectional view of a spline structure of a third embodiment of the present invention.

FIG. 11 illustrates a third embodiment where the spline structure of the present invention is implemented. The third embodiment is obtained by changing the shapes of the first track groove 4 and the second track groove 5 of the first embodiment. The same reference numerals are assigned to configurations similar to those of the first embodiment, and detailed descriptions thereof are omitted.

As illustrated in FIG. 11, the bottom portion 21a of the first track groove 21 of the outer ring 1 along the length direction has a concave curve shape and, in the embodiment, has an arc shape. The center (center of curvature) $O_3$ of the bottom portion 21a of the first track groove 21 is located in the plane P that passes the center O of precession and is orthogonal to the axial line of the outer ring 1. The radius of curvature of the first track groove 21 is $r_3$.

The bottom portion 5a of the second track groove 5 of the inner ring 2 along the length direction has a concave curve shape and, in the embodiment, has an arc shape. The center (center of curvature) $O_1$ of the bottom portion 5a of the second track groove 5 is located in the plane P that passes the center O of precession and is orthogonal to the axial line $L_2$ of the inner ring 2. The radius of curvature of the second track groove 5 is $r_2$.

One ball 3 is placed between each first track groove 21 and each second track groove 5. With the precession of the inner ring 2, the ball 3 reciprocates in the axial direction between the first track groove 21 and the second track groove 5. The position of the ball 3 is determined by the first track groove 21 and the second track groove 5. A cage for retaining the ball 3 is not provided between the inner ring 2 and the outer ring 1.

According to the third embodiment, effects similar to the effects (1) and (3) of the first embodiment are exerted.

Precession Speed-Reducing Apparatus of Second Embodiment

Figure 12:
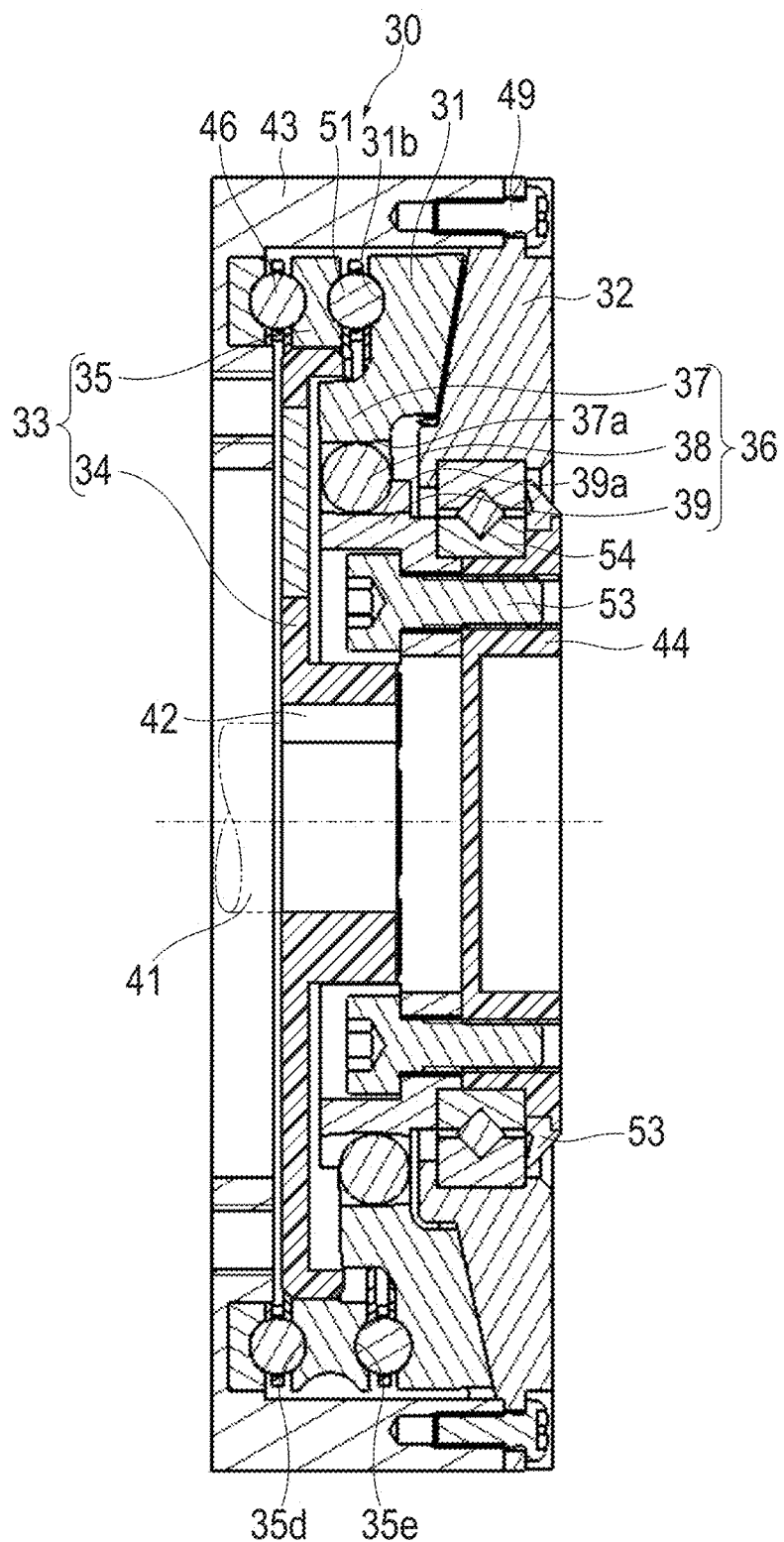
FIG. 12 is a cross-sectional view of a precession speed-reducing apparatus of the second embodiment of the present invention.

FIG. 12 illustrates a cross-sectional view of a precession speed-reducing apparatus 30 of the second embodiment of the present invention where the spline structure of the first embodiment of the present invention is integrated. A reference numeral 31 denotes a first crown gear, a reference numeral 32 denotes a second crown gear, a reference numeral 33 denotes a cam unit, and a reference numeral 36 denotes a spline structure.

An input shaft 41 of, for example, a motor is coupled to the cam unit 33 via a key 42 in such a manner as to be incapable of relative rotation. The cam unit 33 causes the first crown gear 31 to incline in such a manner as to mesh with the second crown gear 32. When the input shaft 41 is rotated, the cam unit 33 causes the first crown gear 31 to precess in such a manner as to move the meshing position. The second crown gear 32 is fixed to a housing 43 in such a manner as to be incapable of rotating. With the precession of the first crown gear 31, the first crown gear 31 reduces the speed and rotates by the difference in the number of teeth between the first crown gear 31 and the second crown gear 32. The output of the first crown gear 31 is taken to an output unit 44 via the spline structure 36.

Figure 13:
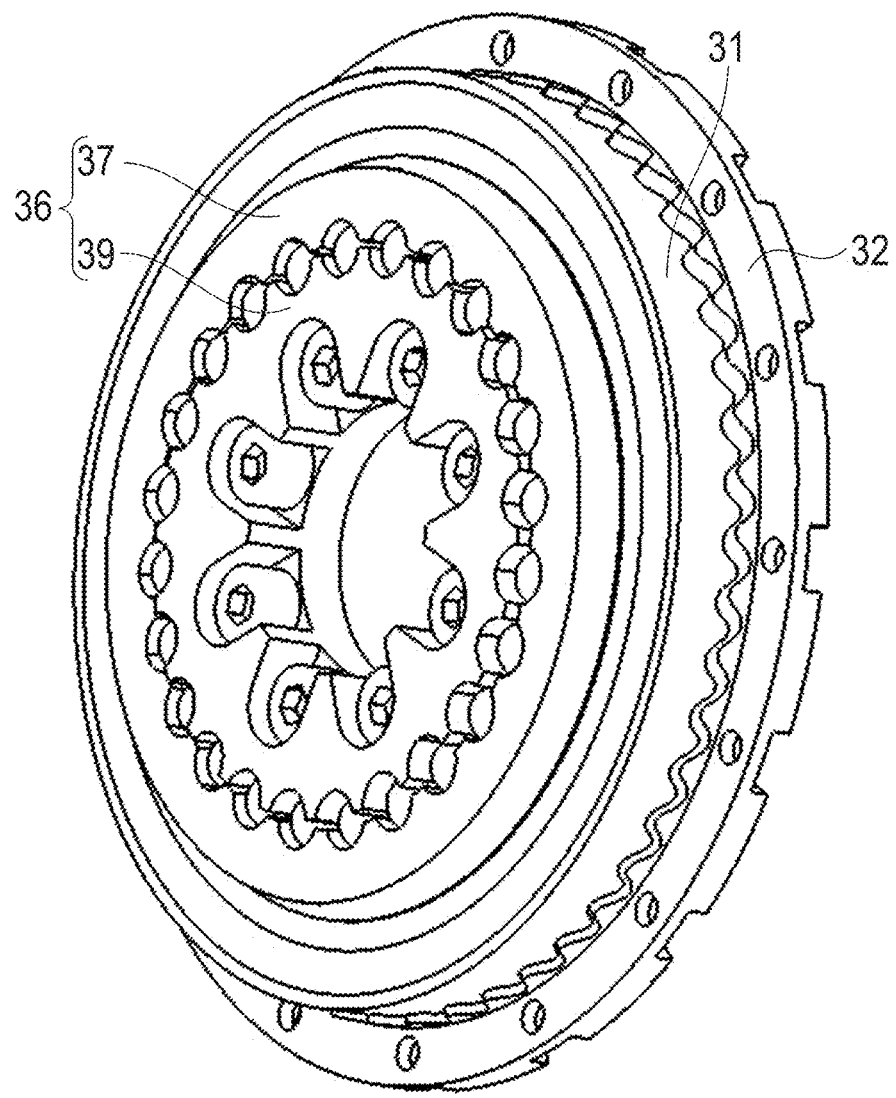
FIG. 13 is a perspective view of a first crown gear, a second crown gear, and the spline structure of the precession speed-reducing apparatus of the second embodiment.

FIG. 13 illustrates a perspective view of the first crown gear 31 and the second crown gear 32 as viewed from the first crown gear 31 side. As illustrated in FIG. 13, the first crown gear 31 inclines and meshes with the second crown gear 32. The output of the first crown gear 31 is taken to the output unit 44 fastened to an inner ring 39 via the spline structure 36.

The configuration of the precession speed-reducing apparatus 30 of the second embodiment is described with reference to FIGS. 14 and 15. The housing 43 has a bottomed cylindrical shape. A hole 43b is made in a bottom wall 43a of the housing 43. A mounting portion 43a1 for, for example, a screw for mounting on a counterpart component such as a motor is formed in the bottom wall 43a. A ring-shaped race 45 is embedded in the bottom wall 43a. A ring-shaped rolling element rolling portion 45a where multiple rolling elements 46 such as balls roll between the housing 43 and the cam unit 33 is formed on the race 45. The rolling elements 46 are rotatably retained by a retainer 47.

The cam unit 33 includes a substantially disc-shaped first member 34 that is coupled to the input shaft 41, and a ring-shaped second member 35. A substantially tubular hollow portion 34a where the input shaft 41 is inserted is formed in the first member 34.

Figure 16:
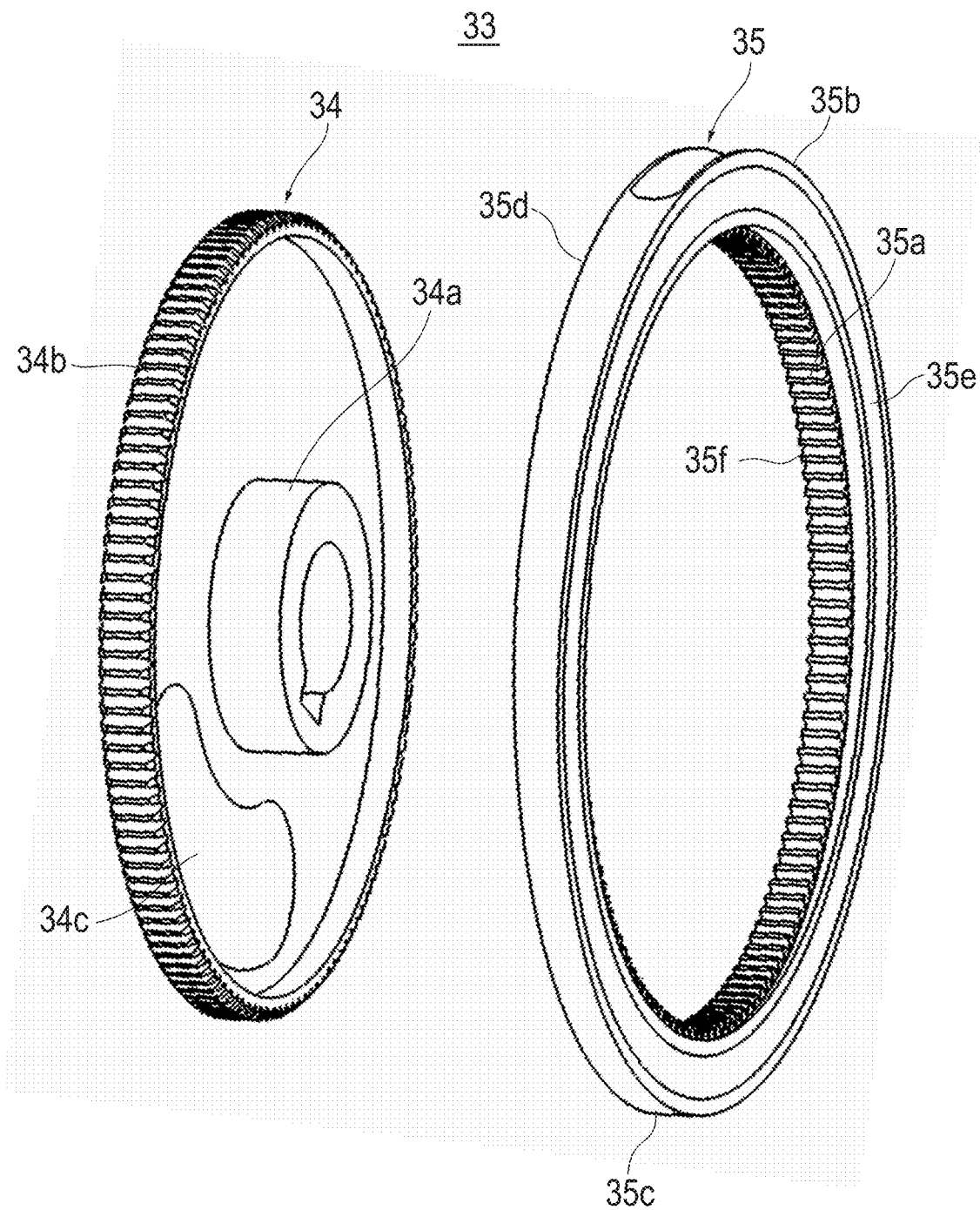
FIG. 16 is an exploded perspective view of a cam unit of the precession speed-reducing apparatus of the second embodiment.

FIG. 16 illustrates an enlarged view of the cam unit 33. A first spline 34b with multiple projections and depressions is formed on an outer periphery of the first member 34. Each of the projections and depressions extends in the axial direction of the first member 34. A substantially arc-shaped balance weight 34c for balancing the cam unit 33 is embedded in the first member 34. The first member 34 is made of, for example, resin except the portion of the balance weight 34c. As long as the material of the first member 34 has a lower specific gravity than steel, the material is not limited to resin, and may be light metal such as a light aluminum alloy. The balance weight 34c is made of, for example, steel.

The second member 35 includes a thick portion 35b and a thin portion 35c, which are spaced apart 180° in the circumferential direction in such a manner that the first crown gear 31 can incline. As illustrated in FIG. 15, a ring-shaped rolling element rolling portion 35d where multiple rolling elements 46 such as balls roll between the race 45 and the cam unit 33 is formed on one end surface of the second member 35. As illustrated in FIG. 14, a ring-shaped rolling element rolling portion 35e where multiple rolling elements 51 such as balls roll between the cam unit 33 and the first crown gear 31 is formed on the other end surface of the second member 35. The rolling element 51 is rotatably retained by a retainer 52. The second member 35 is made of steel.

As illustrated in FIG. 16, a hole 35a where the first member 34 is fitted is formed in the second member 35. A second spline 35f with multiple projections and depressions is formed on an inner surface of the hole 35a. Each of the projections and depressions extends in the axial direction of the second member 35. When the first member 34 is fitted into the hole 35a of the second member 35, the first spline 34b and the second spline 35f fit together and then torque can be transmitted.

Figure 14:
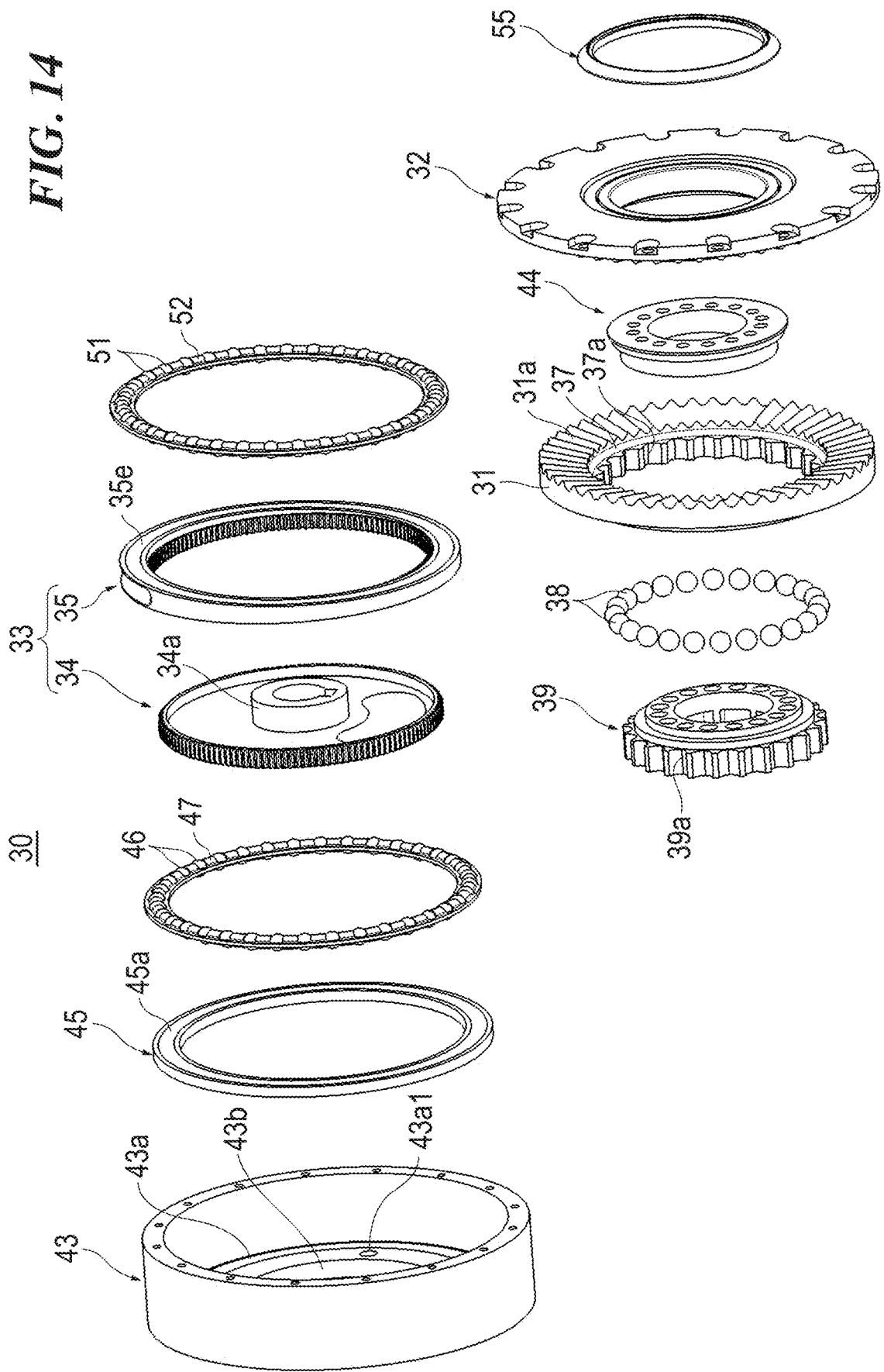
FIG. 14 is an exploded perspective view (front-side exploded perspective view) of the precession speed-reducing apparatus of the second embodiment.

As illustrated in FIG. 14, the first crown gear 31 has a substantially ring shape. A plurality of teeth 31a is radially formed on an opposed surface of the first crown gear 31 to the second crown gear 32. As illustrated in FIG. 15, a ring-shaped rolling element rolling portion 31b where the rolling elements 51 roll is formed on an opposed surface of the first crown gear 31 to the cam unit 33.

Figure 15:
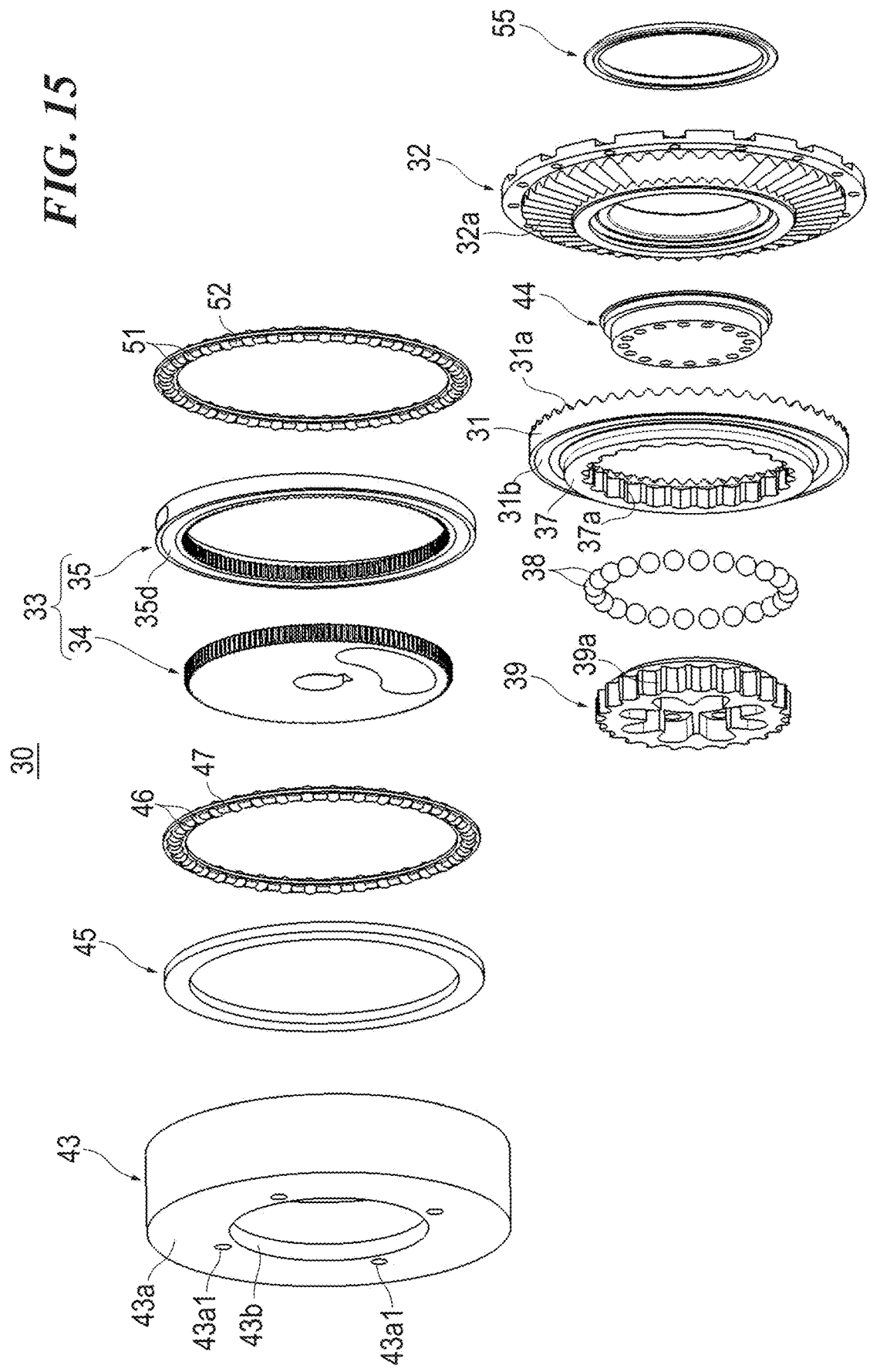
FIG. 15 is an exploded perspective view (rear-side exploded perspective view) of the precession speed-reducing apparatus of the second embodiment.

As illustrated in FIG. 15, the second crown gear 32 has a substantially ring shape. A plurality of teeth 32a is radially formed on an opposed surface of the second crown gear 32 to the first crown gear 31. The number of the teeth 31a of the first crown gear 31 is different from the number of the teeth 32a of the second crown gear 32. The second crown gear 32 is fastened to the housing 43 by a fastening member such as a bolt 49 (refer to FIG. 12).

As illustrated in FIG. 12, the spline structure 36 includes an outer ring 37 as the outer member, the inner ring 39 as the inner member, and balls 38. The first crown gear 31 and the rolling element rolling portion 31b are formed integrally with the outer ring 37. In other words, the outer ring 37, the first crown gear 31, and the rolling element rolling portion 31b are made of the same material, and are not separated.

A first track groove 37a is formed on an inner surface of the outer ring 37 (refer also to FIGS. 14 and 15). A bottom portion along a length direction of the first track groove 37a has a linear shape. A second track groove 39a facing the first track groove 37a is formed on an outer surface of the inner ring 39 (refer also to FIGS. 14 and 15). A bottom portion along a length direction of the second track groove 39a has a concave arc shape.

The output unit 44 is fastened to the inner ring 39 by a fastening member 53 such as a bolt. The output unit 44 is rotatably supported by the second crown gear 32 via a bearing 54 such as a cross roller bearing. A dust seal 55 that blocks a gap between the output unit 44 and the second crown gear 32 is mounted therebetween.

Differences between the precession speed-reducing apparatus 9 of the first embodiment and the precession speed-reducing apparatus 30 of the second embodiment are described below. The precession speed-reducing apparatus 30 of the second embodiment is designed in such a manner as to achieve flattening and reductions in size and weight as compared to the precession speed-reducing apparatus 9 of the first embodiment.

In the precession speed-reducing apparatus 9 of the first embodiment, the spline structures 1, 2, and 3 are placed outward of the first crown gear 11 and the second crown gear 12 (refer to FIG. 7) while in the precession speed-reducing apparatus 30 of the second embodiment, the first crown gear 31 and the second crown gear 32 are placed outward of the spline structure 36 as illustrated in FIG. 12. Consequently, even if the precession speed-reducing apparatus 30 is flattened and reduced in size, the first crown gear 31 and the second crown gear 32 are increased in diameter. When they are increased in diameter, the load acting on the first crown gear 31 and the second crown gear 32 due to the torque is reduced, and the first crown gear 31 and the second crown gear 32 can be materialized even in a small module and with a small face width. Moreover, an additional number of teeth can be given to the small module. Accordingly, a large reduction ratio (for example, 100 or greater) is also possible. Furthermore, if the module is made small, interference with an adjacent tooth is reduced, and the angle of inclination of the cam unit 33 that gives precession can be designed to be small. As a result, the balance weight 34c of the cam unit 33 becomes smaller, and balancing is facilitated.

According to the precession speed-reducing apparatus 30 of the second embodiment, the following effects are further exerted: The bottom portion of the first track groove 37a of the outer ring 37 of the spline structure 36 has a linear shape, and accordingly it is easy to process the first crown gear 31 and/or the rolling element rolling portion 31b integrally with the outer ring 37. The outer ring 37, the first crown gear 31, and the rolling element rolling portion 31b are processed by, for example, casting, and accordingly if the bottom portion of the first track groove 37a of the outer ring 37 has an arc shape, it is difficult to integrally form them. Moreover, if the outer ring 37, the first crown gear 31, and the rolling element rolling portion 31b are integrally formed, the necessity of a fastening bolt is eliminated, and accordingly the space efficiency is improved, and it is possible to have a hollow structure and a flat structure, which have a large opening portion on the inner side of the inner ring 39.

If the first crown gear 31 is increased in diameter, the cam unit 33 that causes the first crown gear 31 to precess is also increased in diameter. However, if the first member 34 of the cam unit 33 is made of, for example, resin, the inertia of the cam unit 33 can be reduced even if the cam unit 33 is increased in diameter. Moreover, the second member 35 of the cam unit 33 is made of steel; accordingly, it is possible to prevent the durability of the cam unit 33 from decreasing.

The second spline 35f is formed on the inner surface of the hole 35a of the second member 35 of the cam unit 33. The first spline 34b that engages with the second spline 35f is formed on the outer surface of the first member 34. Accordingly, the torque can be reliably transmitted between the first member 34 and the second member 35. Moreover, the first member 34 is designed to be fitted into the hole 35a of the second member 35. Accordingly, misalignment can also be permitted. For example, the shaft of the motor is directly coupled as the input shaft 41 to the first member 34. Even if there is an error in mounting of the motor, the fitting portion of the first member 34 and the second member 35 can accommodate the mounting error.

The precession speed-reducing apparatus 30 of the second embodiment can achieve flattening and reductions in size and weight, and therefore is suitable for, for example, an assist suit (a suit having a power assist function that reduces the load on the lower back of a worker produced upon lifting loads) in addition to an industrial robot such as an arm robot.

On the other hand, if the output unit 44 is set on the input side, the cam unit 33 is set on the output side, and an output shaft is coupled to the cam unit 33, use as a speed-increasing apparatus is possible.

The present invention is not limited to the implementation of the above embodiments, and can be implemented as various embodiments within the scope that does not change the gist of the present invention.

In the above embodiments, the first track groove is formed into a linear or concave arc shape throughout its length in the axial direction. The second track groove is formed into a linear or concave arc shape throughout its length in the axial direction. However, parts thereof in the axial direction can also be formed into a linear or concave arc shape.

In the above embodiments, the first track groove and/or the second track groove are formed into a concave arc shape, but can also be formed into curves such as a clothoid curve, a Bezier curve, and a spline curve.

In the above embodiments, the first and second track grooves extend in the axial direction. However, the first and second track grooves can also be inclined in directions opposite to each other with respect to the axial line to place the ball at the intersection portion of the first and second track grooves.

The description is based on Japanese Patent Application No. 2017-149606 filed on Aug. 2, 2017 and Japanese Patent Application No. 2018-079781 filed on Apr. 18, 2018, the entire contents of which are incorporated herein.

REFERENCE SIGNS LIST

1 Outer ring (outer member)
2 Inner ring (inner member)
3 Ball
4 First track groove
4a Bottom portion of the first track groove
5 Second track groove
5a Bottom portion of the second track groove
11 First crown gear
12 Second crown gear
13 Input unit
14 Output unit
18 Inclined cam
21 First track groove
21a Bottom portion of the first track groove
22 Second track groove
22a Bottom portion of the second track groove
$O_1$ Center of the second track groove
O Center of precession of the inner ring
$L_1$ Axial line of the outer ring
$L_2$ Axial line of the inner ring
P Plane orthogonal to the axial line of the inner ring
$\alpha_1$ Angle of contact of the first track groove
$\alpha_2$ Angle of contact of the second track groove
31 First crown gear
31b Rolling element rolling portion
33 Cam unit
34 First member of the cam unit
34a Hollow portion
34b First spline
35 Second member of the cam unit
35e Rolling element rolling portion
35a Hole of the second member
35f Second spline
37 Outer ring (outer member)
37a First track groove
41 Input shaft
51 Rolling element

The invention claimed is:

1. A speed-reducing or -increasing apparatus, comprising:
a first crown gear;
a second crown gear facing the first crown gear;
a cam unit, configured to cause the first crown gear to incline with respect to the second crown gear in such a manner that the first crown gear meshes with the second crown gear, to cause the first crown gear to precess in such a manner as to move the meshing position, and to be coupled to an input or output shaft; and a rolling element between the cam unit and the first crown gear, wherein the cam unit includes:
- a first member configured to be coupled to the input or output shaft, and
- a second member made of steel and including a rolling element rolling portion where the rolling element rolls, the second member being configured to be incapable of rotating relatively to the first member, and wherein at least part of the first member has a lower specific gravity than the second member.

2. The speed-reducing or -increasing apparatus according to claim 1, wherein at least part of the first member is made of resin or light metal.

3. The speed-reducing or -increasing apparatus according to claim 2,
wherein the second member includes a hole where the first member is fitted and a second spline on an inner surface of the hole, and
wherein the first member includes a first spline configured to engage with the second spline on an outer surface of the first member in such a manner that torque is transmittable to the second member.

4. The speed-reducing or -increasing apparatus according to claim 1,
wherein the second member includes a hole where the first member is fitted and a second spline on an inner surface of the hole, and
wherein the first member includes a first spline configured to engage with the second spline on an outer surface of the first member in such a manner that torque is transmittable to the second member.

5. The speed-reducing or -increasing apparatus according to claim 1, further comprising:
a spline structure, configured to permit the first crown gear to precess, and restricting rotation of the first crown gear about an axial line thereof, or taking output of the first crown gear to the output shaft,
the spline structure comprising:
- an outer member including a first track groove on an inner surface thereof,
- an inner member including a second track groove on an outer surface thereof, and
- a ball placed between the first track groove and the second track groove in such a manner as to permit the inner member to incline with respect to the outer member, wherein:
- a bottom portion, along a length direction, of at least part of one of the first or second track grooves has either of a linear shape and a concave curve shape,
- a bottom portion, along a length direction, of at least part of the other one of the first or second track grooves has a concave curve shape, and
- the ball is sandwiched between at least the part of the first track groove and at least the part of the second track groove.

6. The speed-reducing or -increasing apparatus according to claim 5, wherein the bottom portion of the first track groove has the linear shape, and the bottom portion of the second track groove has the concave curve shape.

7. The speed-reducing or -increasing apparatus according to claim 6, wherein an angle $\alpha_2$ of contact of the second track groove is greater than an angle $\alpha_1$ of contact of the first track groove,
the angle $\alpha_1$ of contact of the first track groove being an angle formed by a line $L_3$ linking a center of the ball and the bottom portion of the first track groove, and a line $L_4$ linking the center of the ball and a point of contact with the first track groove, and
the angle $\alpha_2$ of contact of the second track groove being an angle formed by the line $L_3$ linking the center of the ball and the bottom portion of the second track groove, and a line $L_5$ linking the center of the ball and a point of contact with the second track groove.

8. The speed-reducing or -increasing apparatus according to claim 6, wherein the curve of the concave curve shape is an arc.

9. The speed-reducing or -increasing apparatus according to claim 8, wherein the center of the second track groove is located in a plane that passes the center of precession of the inner member and is orthogonal to an axial line of the inner member.

10. The speed-reducing or -increasing apparatus according to claim 5, wherein a position of the ball is determined by the first and second track grooves, and a cage for retaining the ball is not provided between the outer member and the inner member.

* * * * *